United States Patent
Aiba et al.

(10) Patent No.: US 7,055,295 B1
(45) Date of Patent: Jun. 6, 2006

(54) ANNULAR SUSTAINED RELEASE PHEROMONE-DISPENSER AND ITS INSTALLATION TOOL

(75) Inventors: Noboru Aiba, Niigata (JP); Fumiaki Mochizuki, Niigata (JP); Ryuichi Saguchi, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 32 days.

(21) Appl. No.: 09/690,377

(22) Filed: Oct. 17, 2000

Related U.S. Application Data

(62) Division of application No. 09/173,411, filed on Oct. 15, 1998, now Pat. No. 6,216,960.

(30) Foreign Application Priority Data

| Oct. 17, 1997 | (JP) | .................................. 9-285460 |
| Oct. 17, 1997 | (JP) | .................................. 9-285461 |
| Dec. 9, 1997 | (JP) | .................................. 9-338355 |

(51) Int. Cl.
*B65B 3/02* (2006.01)

(52) U.S. Cl. ............................ 53/452; 53/453; 53/454; 53/451

(58) Field of Classification Search ................ 53/452, 53/453, 454, 451, 122, 522, 559, 560, 373.6; 424/409, 443, 84; 239/44
See application file for complete search history.

(56) References Cited

U.S. PATENT DOCUMENTS

| 4,017,030 | A | * | 4/1977 | Coplan et al. ................. 239/44 |
| 4,666,767 | A | * | 5/1987 | Von Kohorn et al. ......... 424/84 |
| 4,923,119 | A | * | 5/1990 | Yamamoto et al. .......... 424/443 |
| 5,069,231 | A | * | 12/1991 | Rutherford ................... 131/335 |
| 5,415,868 | A | * | 5/1995 | Smith et al. ................... 53/454 |
| 5,442,897 | A | * | 8/1995 | Hinzmann et al. ............ 53/452 |
| 5,993,843 | A | * | 11/1999 | Sakurada et al. ........... 424/409 |

* cited by examiner

*Primary Examiner*—Sameh H. Tawfik
(74) *Attorney, Agent, or Firm*—Reed Smith LLP

(57) ABSTRACT

Herein disclosed is an annular sustained release pheromone-dispenser which has a shape favorable for packaging and transportation, can easily be installed, can maintain its installed condition over a long time period and can easily be handled even after use without any trouble. Also provided is a tool for easily and rapidly installing a pheromone-dispenser at elevated spots of, for instance, fruit trees.

The sustained release pheromone-dispenser comprises a plurality of plastic tubes 2a and 2b arranged in parallel and capable of being semi-resiliently deformed, whose ends 3 are connected together by fusion and whose central portions are independent and can form a annular space therebetween by pulling them apart from one another; and a liquid synthetic sex pheromone 1 enclosed in these plurality of plastic tubes 2a, 2b without impairing the pheromone-release capacity. The tool 37 for installing an annular sustained release pheromone-dispenser has hooks 32 for attaching or detaching the annular sustained release pheromone-dispenser which are pulled apart from each other. The hooks 32 are positioned on both upper ends of the wire and the lower end 38 of the wire is secured to the top end of a rod 33.

2 Claims, 11 Drawing Sheets

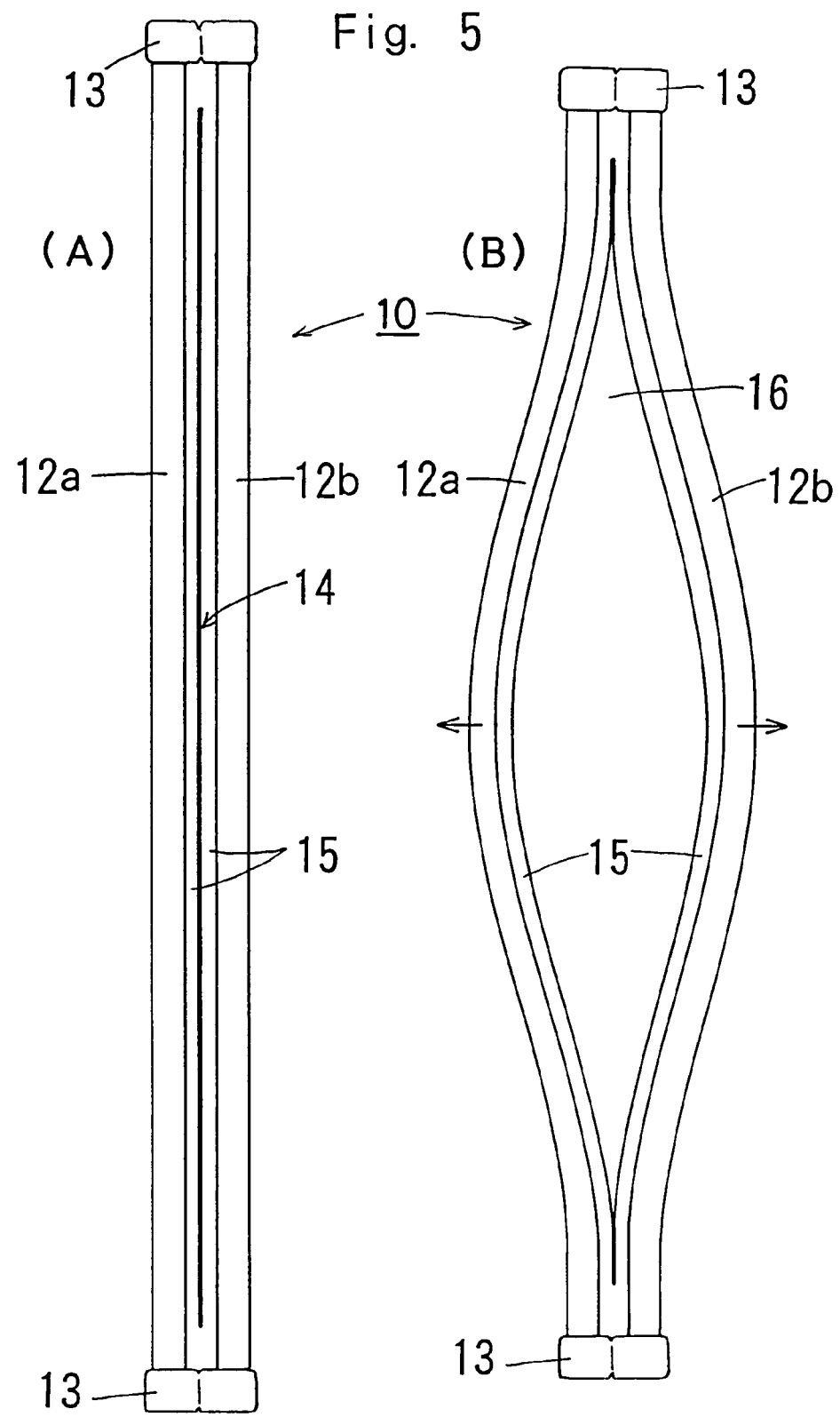

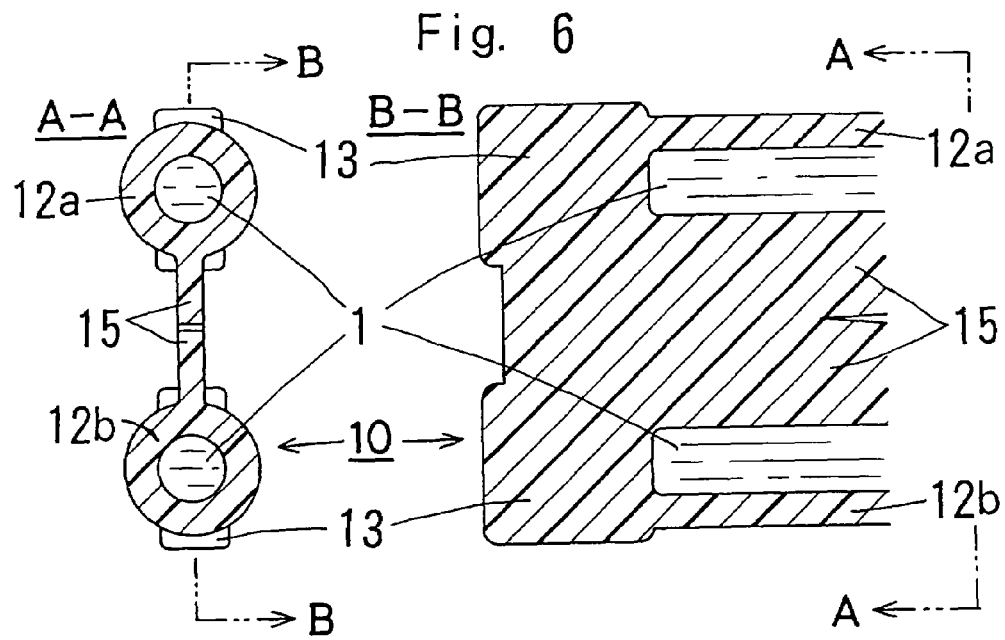
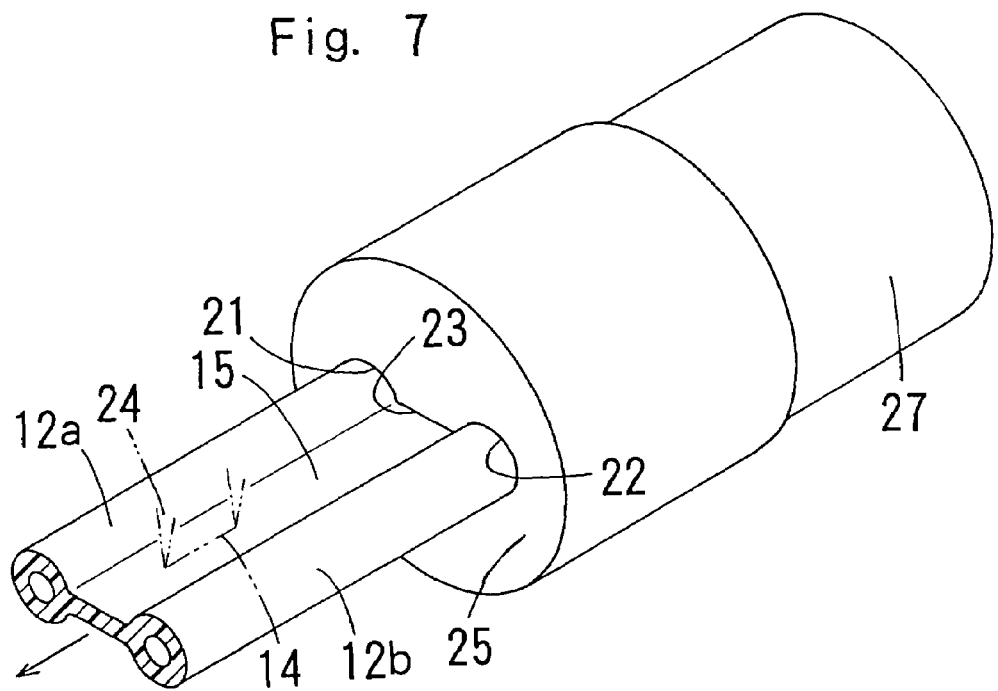

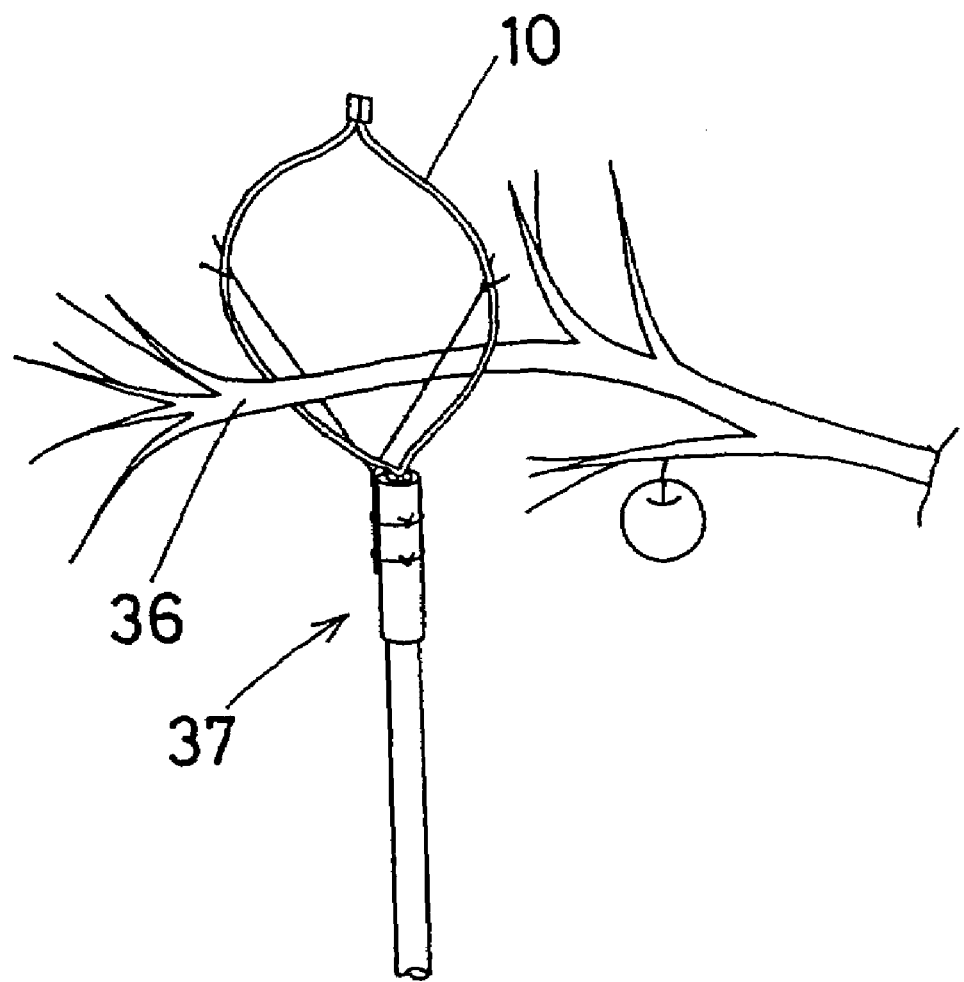

ANNULAR SUSTAINED RELEASE PHEROMONE-DISPENSER AND ITS INSTALLATION TOOL

This application is a divisional of prior application Ser. No. 09/173,411 filed on Oct. 15, 1998 and issued on Apr. 17, 2001 as U.S. Pat. No. 6,216,960.

BACKGROUND OF THE INVENTION

The present invention relates to an annular sustained release pheromone-dispenser which can release a synthetic sex pheromone in the air to control the harmful insects by disturbing the copulative communication of the insects as well as a method for preparing the pheromone-dispenser and a tool for installing the pheromone-dispenser.

The control of a harmful insect through disturbance of the copulative communication thereof is carried out by releasing the synthetic sex pheromone of the insect to be controlled in the air to thus reduce the rate of copulation through the disturbance of their copulative communication and to thereby inhibit the breeding of the next generation. Therefore, a pheromone-dispenser for releasing a synthetic sex pheromone should satisfy such a requirement that it can stably release the sex pheromone over the entire term (2 to 6 months) of the occurrence of the corresponding harmful insect.

The pheromone-dispensers which have already been put on the market are designed in such a manner that a liquid synthetic sex pheromone is enclosed in, for instance, a tube type, bag type, bottle type or spiral tube type plastic container and the sex pheromone which diffuses and permeates through the wall of the container is evaporated and released into the air. Among these pheromone-dispensers, those generally referred to as the tube type ones employ a plastic tubular container (slender tube) and show the most excellent control effect as compared with the other type ones since they can release the sex pheromone vapor over a long period of time and can ensure a uniform release rate.

When using such pheromone-dispensers, they must be set up and distributed so as to uniformly release the synthetic sex pheromone in the field and must stably hold their set up condition over a long time period without imparting any harmful effect and/or damage to the growth of plants.

As conventional tubular type pheromone-dispensers which can satisfy these requirements, Japanese Patent Application Publication Nos. 61-16361 and 2-63017 disclose those in which a metal wire such as an aluminum wire is arranged parallel to the tube; Japanese Utility Model Provisional Publication No. 62-122801 discloses a pheromone-dispenser having a ring-like shape formed by bending a tube; and Japanese Utility Model Application Publication No. 63-722 discloses a pheromone-dispenser produced by bending a tube.

In the pheromone-dispenser in which a metal wire is arranged parallel to the tube, the tube shows excellent shape-retaining ability since it can easily be bent together with the metal wire. Accordingly, operations for installation such as hooking it on or winding it around a branch or trunk of a plant and the dispenser may stably hold its installed condition, but a problem arises such that the metal wire remains even after the use of the dispenser. The pheromone-dispensers obtained by bending a tube per se or by forming a tube into a ring not only require much expenses for shaping processes, but also the bent tube returns to its original shape, i.e., straight form due to the restoring effect of the plastic if the dispenser is installed over a long time period and it may sometimes fall down from, for instance, the branch on which it is hooked. Moreover, it is difficult to closely arrange a large number of these pheromone-dispensers for packaging and this makes the resulting package bulky and increases the expenses required for packaging and/or circulation.

On the other hand, to dispense with much labor for the installation of these pheromone-dispensers, there has been a need for increasing the amount of the synthetic sex pheromone released per one dispenser and reducing the number of the dispensers to be installed per unit area (installation density). The installation density of the dispenser may be reduced by increasing the capacity of the plastic tube of the pheromone-dispenser and correspondingly increasing the amount of the synthetic liquid pheromone enclosed therein. In this regard, the capacity of the plastic tube can be increased by extending the length of the tube, but such a long length of the tube may interfere with the operations for the installation thereof and may make the packaging and transportation thereof undesirable and quite troublesome. Alternatively, the amount of the liquid pheromone to be enclosed in the plastic tube can be improved by increasing the inner diameter of the plastic tube. However, the rate of diffusion and evaporation of the pheromone should be improved by properly adjusting the wall thickness of the plastic tube in order to ensure a release amount of the pheromone proportional to the amount thereof enclosed. For this reason, the fabrication of the plastic tube becomes difficult, the flexibility of the plastic tube is lowered and this in turn makes the bending thereof and its installation operations difficult.

SUMMARY OF THE INVENTION

The present invention has been developed for solving these problems and accordingly, it is an object of the present invention to provide a sustained release pheromone-dispenser which never impairs the release properties observed for the conventional tubular type pheromone-dispenser, which has a shape convenient for packaging and transportation, which makes the installation operations easy, which can stably hold its installed condition over a long time period after its installation and which can easily be handled without any trouble even after the use.

The gaseous sex pheromone released from the pheromone-dispenser is heavier than the air and downward diffuses. To uniformly distribute the sex pheromone in the space in which the harmful insect to be controlled lives, it is necessary to install the pheromone-dispenser at an elevated spot on a plant and therefore, an object of the present invention is to also provide a tool which permits the easy and rapid installation of the pheromone-dispenser at an elevated spot.

According to an aspect of the present invention, as shown in FIG. 1, developed for achieving the foregoing objects, there is provided an annular sustained release pheromone-dispenser 10 which comprises a plurality of plastic tubes 2a and 2b arranged in parallel and capable of being semi-resiliently deformed, whose ends 3 are connected to each other by fusion and whose central portions 4 (see FIG. 2 (B)) are independent and can form an annular space therebetween by pulling them apart from one another; and a liquid synthetic sex pheromone 1 enclosed in each plastic tube 2. Annular sustained release pheromone-dispensers can also be provided by closely arranging more than three plastic tubes.

According to another aspect of the present invention as shown in FIG. 5, there is provided an annular sustained release pheromone-dispenser 10 which comprises a plurality of plastic tubes 12a and 12b integrally connected to each other through a web 15 extending along the longitudinal direction of the plastic tubes; a cut 14 for pulling the plastic tubes apart from one another, which is formed on a part of the web 15 and arranged along the longitudinal direction of the plastic tubes; and a synthetic liquid sex pheromone 1 (see FIG. 6) enclosed in each of the plurality of plastic tubes 12a and 12b, the both ends 13 of each plastic tube 12a or 12b being closed.

The cut portion 14 of the annular sustained release pheromone-dispenser 10 can be realized, as shown in FIG. 8, by forming a groove extending along a direction in agreement with the longitudinal direction of the plastic tubes 12a and 12b.

Similarly, the cut portion 14 can also be realized, as shown in FIG. 9, by forming a perforation extending along a direction in agreement with the longitudinal direction of the plastic tubes 12a and 12b.

Annular sustained release pheromone-dispensers can also be provided by closely arranging more than three plastic tubes.

A method for preparing the annular sustained release pheromone-dispenser 10 according to the present invention comprises the steps of arranging a plurality of continuous plastic tubes 2a and 2b in which a synthetic sex pheromone is accommodated through aspiration, fusing them at predetermined pitches by heating under a pressure and then cutting them at each fused portion 6 to give desired pheromone-dispensers, as shown in FIG. 3. More specifically, after the plastic tubes 2a and 2b are pulled out mechanically at predetermined pitches, the plastic tubes 2a and 2b are put under pressure of 0.1 to 0.2 MPa, and fused at oscillation of 200 to 600 mmsec using 28 to 32 µm ultrasonic vibrator, and then, are cut.

In this production method, the plastic tubes 2a and 2b may likewise be fused by heating under a pressure after sandwiching the portion 6 to be fused between a pair of pieces 7 made of a plastic identical to that of the plastic tubes 2a and 2b, as shown in FIG. 4.

According to a further aspect of the present invention, there is provided a method for preparing the annular sustained release pheromone-dispenser 10 of the invention which comprises the steps of extruding a plastic through a die 25 comprising a plurality of holes 21 and 22 each having a core and slit 23 connecting the plurality of holes 21, 22 to thus continuously form a plurality of plastic tubes 12a and 12b connected together through a web 15 formed by the slit 23; forming a cut 14 on a part of the web 15, extending along a direction in agreement with the longitudinal direction of the plastic tubes 12a and 12b; enclosing a synthetic liquid sex pheromone 1 (see FIG. 6) into each of the plurality of plastic tubes 12a and 12b; and then closing both ends 13a and 13b of the plastic tubes 12a and 12b, as shown in FIG. 7.

According to a further aspect of the present invention developed for achieving the foregoing objects, as shown in FIG. 12, there is provided a tool 37 for installing the annular sustained release pheromone-dispenser of the invention which comprises a restorable wire 31; hooks 32 for attaching or detaching the annular sustained release pheromone-dispenser 10 (see FIG. 13) in which the plastic tubes are pulled apart from one another to give an annular body, which are fitted to both upper ends of the wire 31 and whose lower end 38 is secured to the top end of a rod 33.

BRIEF DESCRIPTION OF THE DRAWINGS

FIG. 5 is a front elevation entirely showing another embodiment of the annular sustained release pheromone-dispenser according to the present invention.

FIG. 6 is a partly enlarged sectional view showing another embodiment of the annular sustained release pheromone-dispenser according to the present invention.

FIG. 7 is a perspective view showing another embodiment for explaining a part of the step for producing plastic tubes of the annular sustained release pheromone-dispenser according to the present invention.

FIG. 14 is a diagram for illustrating an example of the practical use of the tool for installing the annular sustained release pheromone-dispenser according to the present invention.

DETAILED EXPLANATION OF THE INVENTION

The annular sustained release pheromone-dispenser according to the present invention will hereinafter be described in detail with reference to the accompanying drawings which correspond to embodiments of the dispenser.

Figure 1:
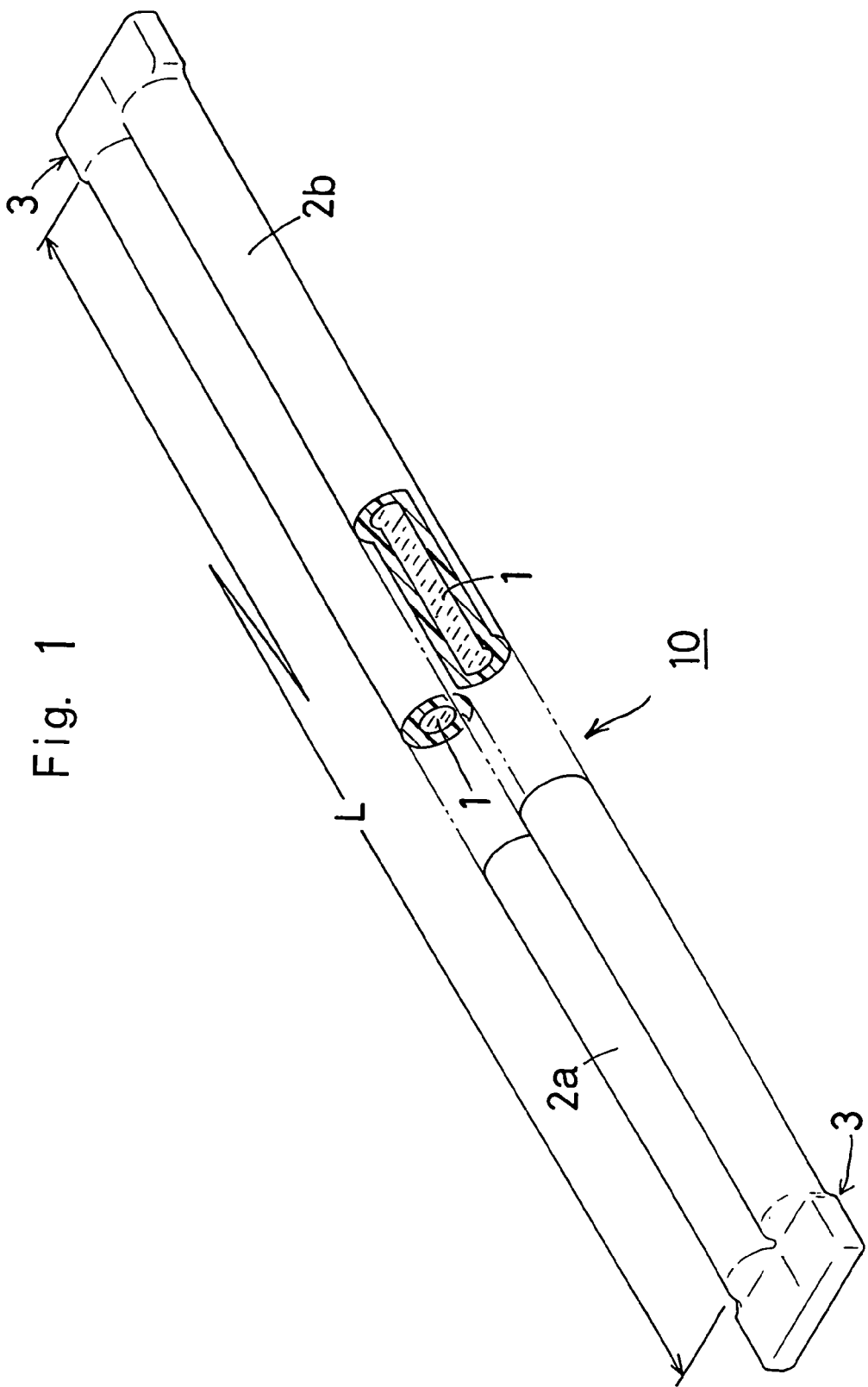
FIG. 1 is a perspective view, partly in section, showing an embodiment of the annular sustained release pheromone-dispenser according to the present invention.
Figure 2:
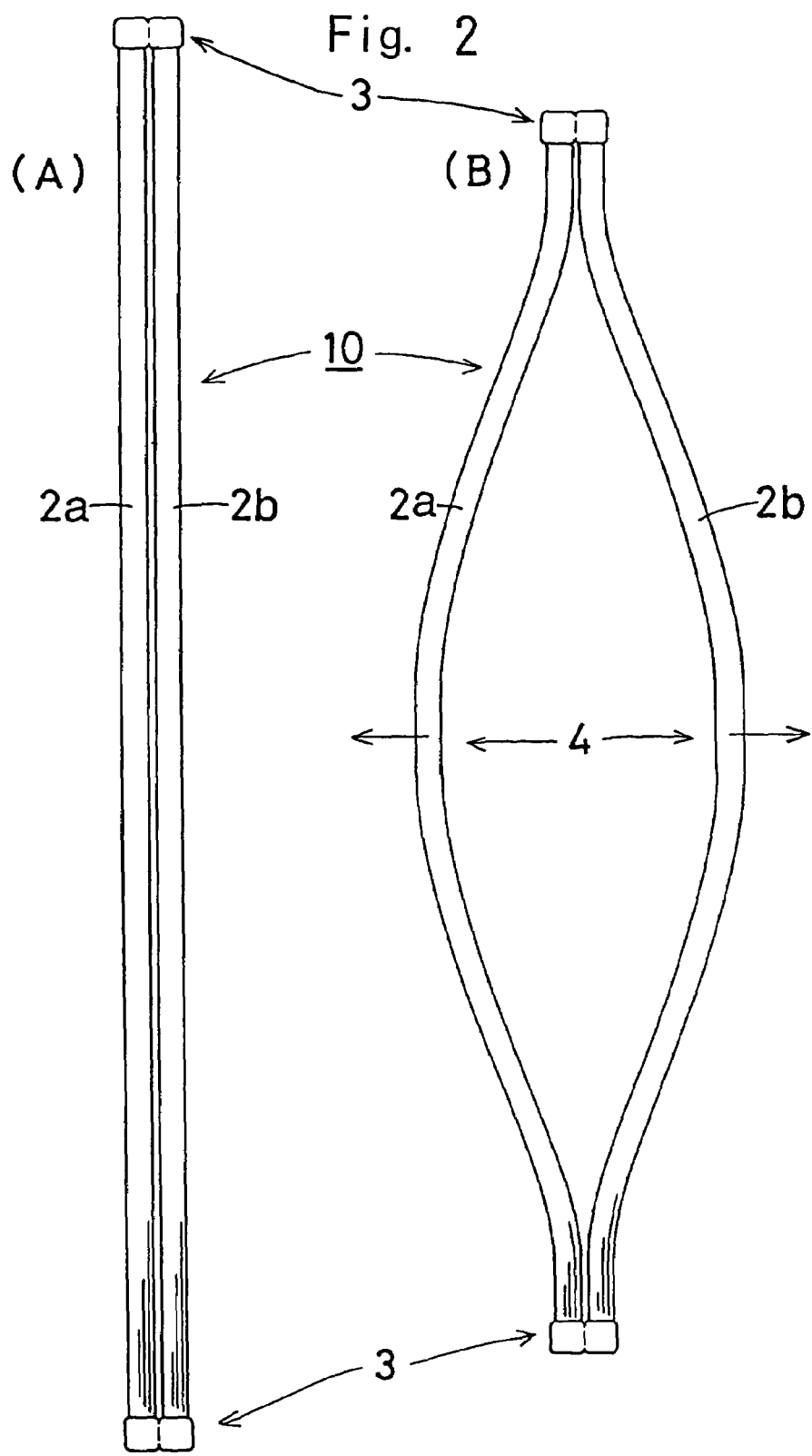
FIG. 2 is a front elevation entirely showing an embodiment of the annular sustained release pheromone-dispenser according to the present invention.
Figure 3:
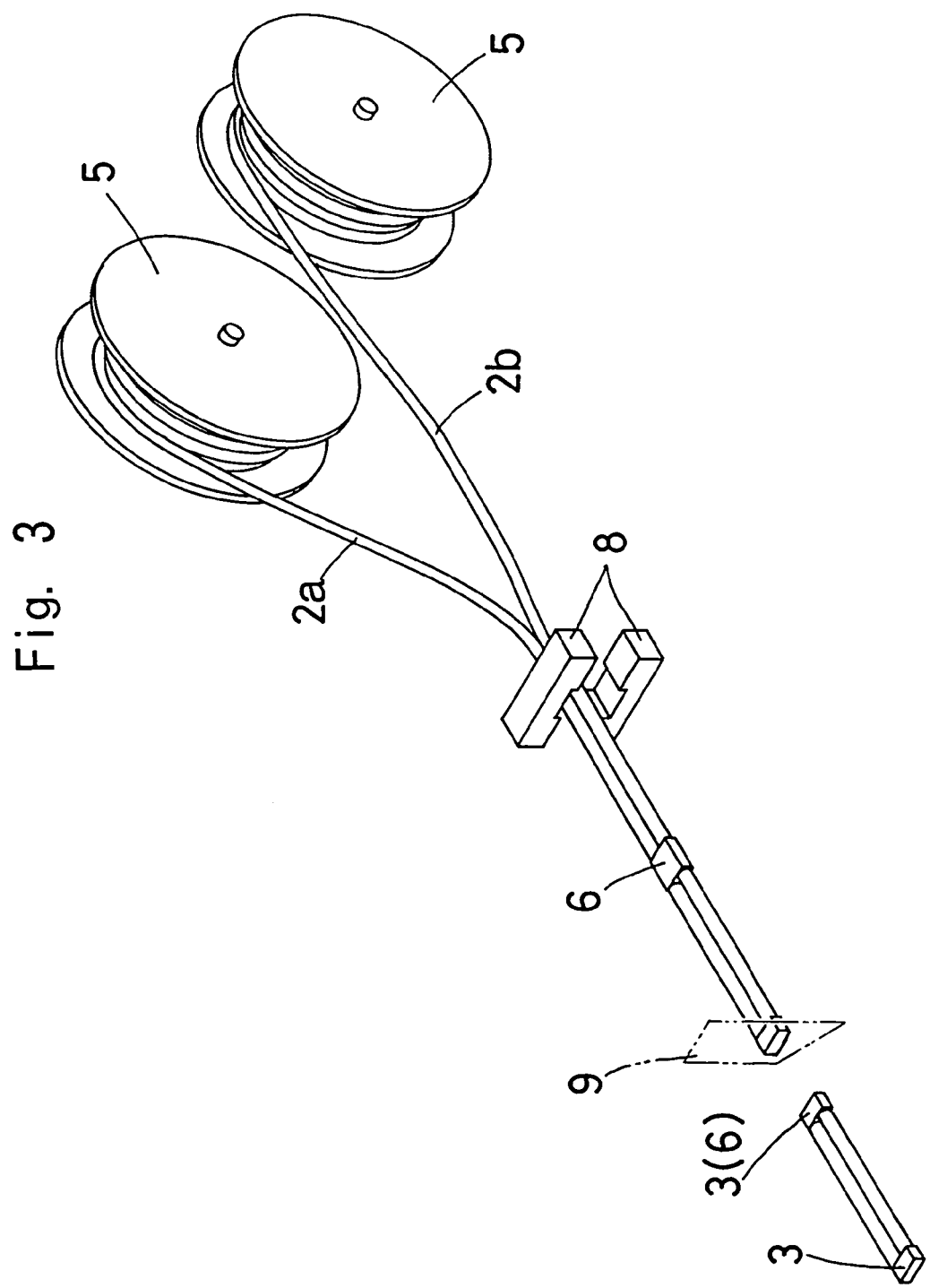
FIG. 3 is a perspective view of the annular sustained release pheromone-dispenser according to the present invention, which is in the course of the production.

The annular sustained release pheromone-dispenser according to the present invention is produced by a method which starts from a step of continuously processing a plastic material such as extrusion-molding step to continuously form plastic tubes having an infinite length, as shown in FIG. 3. Then the continuous plastic tube 2a and 2b are cut into sections having an appropriate length, followed by filling the section (hereunder also referred to as plastic tube) with a synthetic liquid sex pheromone using an aspiration pump and winding it onto reel 5. Two plastic tubes 2a and 2b which are arranged in parallel are continuously drawn through the holes, fused together at desired equal distances (lengths), i.e., the effective length L (see FIG. 1) of the pheromone-dispenser with a heat press 8. Thus, these two plastic tubes are connected to each other at the fused positions and each tubular section is closely sealed. Then the portions 6 thus formed by fusing with heating under a pressure each is cut at the center thereof using a cutter 9 to thus complete an annular sustained release pheromone-dispenser 10 as shown in FIG. 2.

An annular sustained release pheromone-dispenser according to another embodiment of the invention is produced by a method which starts from a step of continuously forming integrated plastic tubes 12a and 12b having an infinite length, as shown in FIG. 7. More specifically, a molten plastic material is extruded, through a die 25 secured to a cylinder 27 of an extrusion molding machine (not shown), into two plastic tubes 12a and 12b connected together in parallel through a web 15, followed by cooling the plastic tubes, forming a groove 14 on the web 15 using a blade or making a perforation-like cut in the web 15 and winding the plastic tubes still having an infinite length onto a reel. The plastic tubes are cut into pieces having a desired length, followed by filling the plastic tubes 12a and 12b with a synthetic liquid sex pheromone 1 through aspiration, fusing the plastic tubes 12a and 12b at desired equal distances and cutting the plastic tubes at the center of the fused portions together with the web 15.

Thus, an annular sustained release pheromone-dispenser 10 which is entirely depicted in FIG. 5 and a part of which is shown in FIG. 6 as an enlarged cross sectional view is completed. The pheromone-dispenser comprises two plastic tubes 12a and 12b which are integrally connected to each other through the web 15, each of which contains the synthetic liquid sex pheromone 1 enclosed therein and which has sealed ends 13a and 13b and a cut 14 formed on the central portion of the web 15.

The materials for the plastic tubes 2a and 2b, 12a and 12b and the web 15 are, for example, thermoplastic resins selected from the group consisting of low density polyethylenes, high density polyethylenes, polypropylenes, ethylene-propylene copolymers, ethylene-vinyl acetate copolymers, ethylene-acrylate copolymers, polyvinyl acetates, polyvinylchloride resins, polystyrenes, polyamide resins, polymethyl methacrylates, polycarbonates, polyvinyl alcohols, polyvinylidene chlorides, polybutylenes, methyl methacrylate-styrene copolymers, methyl pentene resins, ionomers, polyacetals, cellulose acetates, cellulose acetatebutyrates, polyvinylidene fluoride and silicone resins. Alternatively, the material may likewise be a condensation polymer of at least one dicarboxylic acid selected from the group consisting of oxalic acid, malonic acid, succinic acid, glutaric acid, adipic acid, sebacic acid, fumaric acid and maleic acid with at least one polyol selected from the group consisting of ethylene glycol, propylene glycol, butanediol, pentanediol, hexanediol, octanediol and decanediol; or a condensation polymer of at least one member selected from the group consisting of lactic acid, hydroxyvaleric acid, hydroxycaproic acid and hydroxycapric acid; or an aliphatic polyester type thermoplastic resin comprising polycaprolactone. The plastic member 7 for sandwiching the portion 6 to be fused with heating under a pressure is desirably the same material used for the plastic tube which is selected from the foregoing plastics to thus ensure complete fusion. These plastics may comprise additives such as lubricants, plasticizers, stabilizers, pigments and/or fillers in order to improve the processability thereof.

The foregoing plastic material is continuously processed by, for instance, extrusion molding to give a continuous tube having an inner diameter of 0.4 to 2 mm, preferably 0.6 to 1.6 mm, and a wall thickness of 0.2 to 1.5 mm, preferably 0.3 to 0.8 mm. If the inner diameter of the plastic tubes 2a and 2b, 12a and 12b is smaller than the lower limit, it is technically difficult to form such a tube and to fill the tube with a synthetic liquid sex pheromone by aspiration. If the inner diameter is greater than the upper limit, the resulting tube may accommodate a large amount of the synthetic liquid sex pheromone, but the amount is too excess to ensure economical use of the sex pheromone, while taking into consideration the amount of the sex pheromone required for the disturbance of the copulative communication of insects and the installation density of the annular sustained release pheromone-dispenser. The wall thickness of the plastic tubes 2a and 2b, 12a and 12b has effects on the diffusion and evaporation rates of the sex pheromone, along with the choice of the plastic material. If the wall thickness is thinner than the lower limit, it is quite difficult to form such a plastic tube, while if it is thicker than the upper limit, the diffusion and evaporation rates of the sex pheromone are extremely low, the release thereof is also extremely suppressed and the molding of the plastic tube becomes difficult.

The effective length L of the annular sustained release pheromone-dispenser 10 ranges from 100 to 500 mm, preferably from 100 to 400 mm. This is because if it is shorter than the lower limit, the diameter of the annular portion formed by pulling the central parts 4 and 16 apart from one another is extremely small and it is difficult to put, for instance, branches of plants through the annular portion, while if it is longer than the upper limit, the dispenser is too long to apply to plants grown in fields to which the pheromone-dispenser is commonly used and thus the use thereof is impractical.

Figure 4:
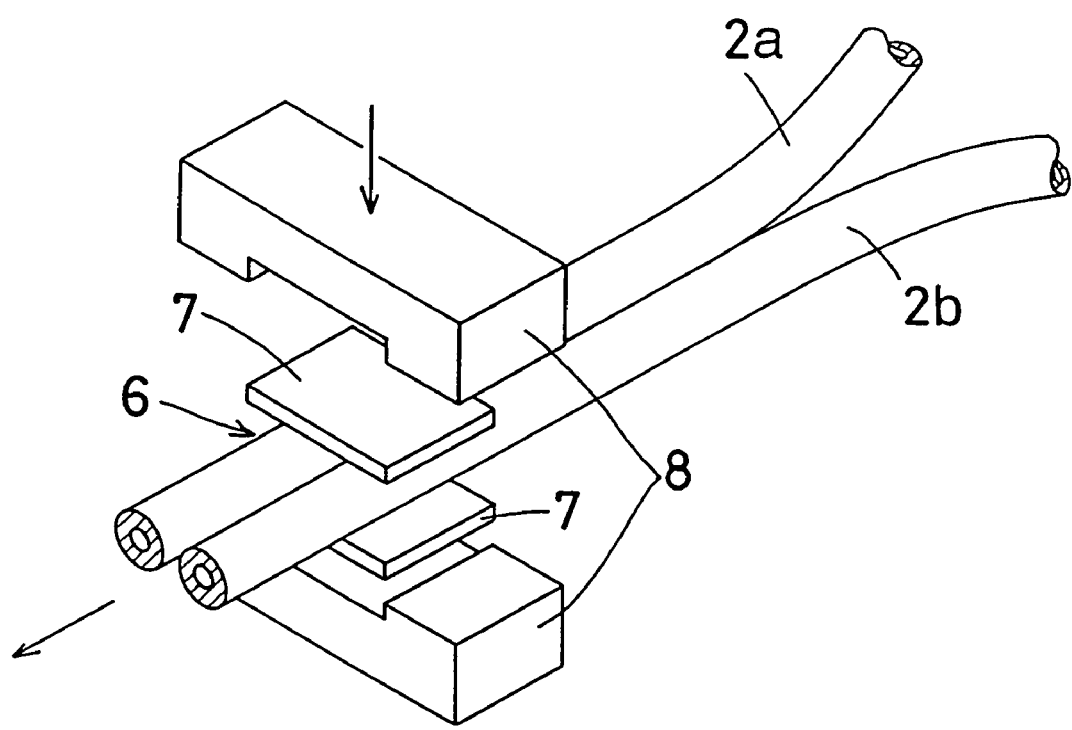
FIG. 4 is an enlarged perspective view showing the portion 6, fused with heating under a pressure, of the annular sustained release pheromone-dispenser according to the present invention, which is in the course of the production.
Figure 8:
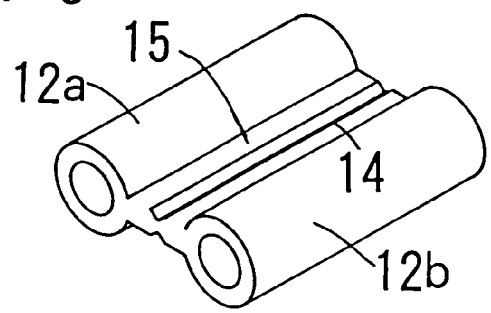
FIG. 8 is a perspective view showing an embodiment of a cut (groove) formed on a web of the annular sustained release pheromone-dispenser according to the present invention.
Figure 9:
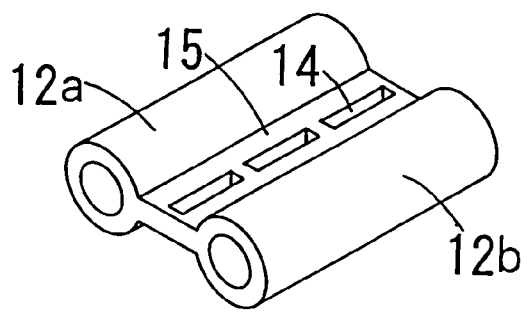
FIG. 9 is a perspective view showing an embodiment of a cut (perforation) formed on a web of the annular sustained release pheromone-dispenser according to the present invention.

It is preferred to set the length of the fused portions at the ends 3 and 13 of the pheromone-dispenser 10 at the range of from 2 to 15 mm, preferably from 3 to 10 mm. If the length is less than the lower limit, these two plastic tubes 2a and 2b or 12a and 12b are insufficiently fused and this accordingly leads to separation of these two plastic tubes. As a result, the pheromone-dispenser 10 through which branches of plants or the like have been passed would often fall down. On the other hand, if the length exceeds the upper limit, it is excessively long from the viewpoint of fusion and this makes the entire length of the dispenser longer and this in turn makes the distribution such as the transportation troublesome. In this connection, the fused portion 6 at the ends 3 and 13 is more firmly bonded if the portion 6 is fused with heating under a pressure after sandwiching the portion between a pair of plastic materials 7 made of the same plastic material used for forming the plastic tubes 2a and 2b, as shown in FIG. 4.

The web 15 connecting a the plastic tubes 12a and 12b, as shown in FIG. 7, preferably has a thickness on the order of about ½ to ¹/₂₀ times, preferably ¼ to ¹/₁₀ times the outer diameter of the plastic tube and a width on the order of about 2 to ⅕ times, preferably 1 to ¼ times the outer diameter of the plastic tube. This is because if it is too thick, the surface area of the plastic tubes 12a and 12b which is exposed to the air is correspondingly reduced and the amount of the synthetic sex pheromone released will be lower, and as a result would be less economical. On the contrary, if it is too thin, the plastic tubes would be apart from each other and would not form an annulus. In addition, if the width of the web 15 is too wide, it would be of no use to increase the width thereof and this makes the installation operations troublesome, while if it is too small, this makes, difficult, the processing for forming a groove, serving as a cut 14, or for forming a perforation.

Figure 10:
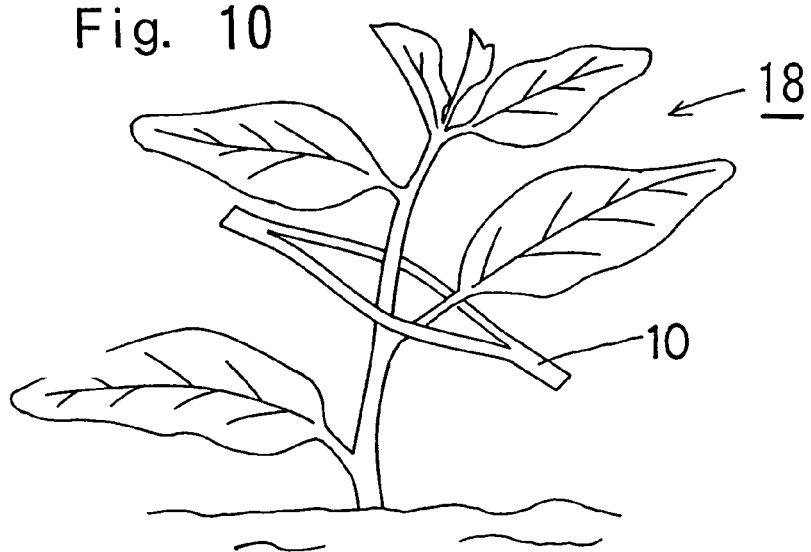
FIG. 10 is a diagram illustrating an example of the practical use of the annular sustained release pheromone-dispenser according to the present invention.
Figure 11:
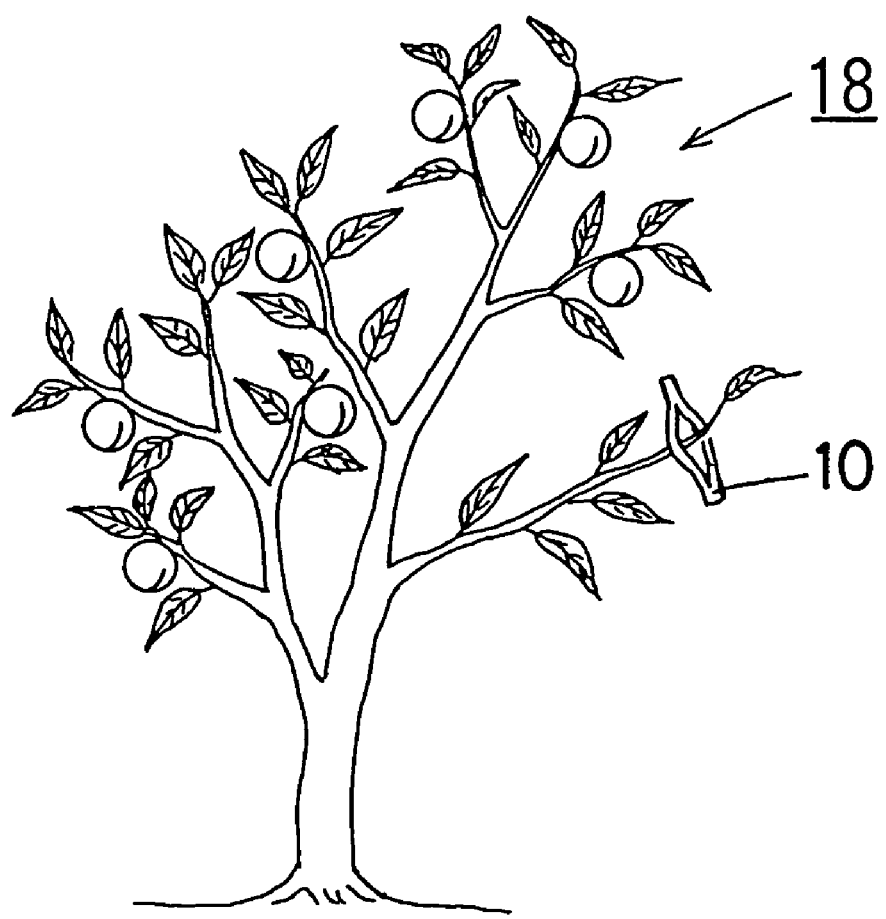
FIG. 11 is a diagram illustrating another example of the practical use of the annular sustained release pheromone-dispenser according to the present invention.

The method for using the pheromone-dispenser will be described in more detail below while taking the annular sustained release pheromone-dispenser 10 as shown in FIG. 2 by way of example. The pheromone-dispenser 10 comprises, as shown in FIGS. 1 and 2, two plastic tubes 2a and 2b arranged in parallel and filled with a synthetic liquid sex pheromone 1 wherein the ends 3 (corresponding to the portions 6 fused with heating under a pressure) are connected to one another through fusion and the central portions 4 of the plastic tubes are independent. Since the plastic tubes 2a and 2b are formed from a semi-resiliently deformable material, the central portions 4 are outwardly and oppositely pulled apart from one another in the directions indicated by arrows in FIG. 2(B) to form an annular space. The plastic tubes 2a and 2b are hung on a hook 32 of a tool for installing the annular sustained release pheromone-dispenser and twigs or trunks of cultivation plants 18 to be protected from harmful insects or a support are put through the annular space of the dispenser as shown in FIGS. 10 and 11 to thus install the annular sustained release pheromone-dispenser 10.

This pheromone-dispenser 10 comprises two plastic tubes 2a and 2b arranged in parallel and filled with a synthetic liquid sex pheromone 1 and therefore, the amount of the sex pheromone 1 released from the dispenser through diffusion and permeation is equal to two times that observed for the dispenser comprising a single plastic tube. For this reason, the installation density of the pheromone-dispenser can be reduced to ½ times that required for the conventional pheromone-dispenser and this in turn permits the reduction of the time and labor required for its installation.

The ring formed by pulling the two plastic tubes of the pheromone-dispenser 10 appropriately presses, for instance twigs which pass through the ring because of the tendency of restoration due to the resilience of the dispenser, is deformed in response to the growth thereof without causing any damage or preventing the growth of the twigs and therefore, the ring can stably maintain its installed condition over a long time period.

In this installed condition, the synthetic sex pheromone which diffuses and permeates through the plastic tubes 2a and 2b of the pheromone-dispenser is gradually evaporated and released in the air, the concentration of the pheromone in the air is also gradually increased so that the copulative communication of harmful insects is disturbed and the breeding of the next generation thereof is inhibited.

The annular sustained release pheromone-dispenser shown in FIG. 5 is used according to the method similar to that used for the pheromone-dispenser shown in FIG. 2.

Then the tool 37 for installing the annular sustained release pheromone-dispenser according to the present invention will be described in more detail with reference to FIGS. 12 to 14.

Figure 12:
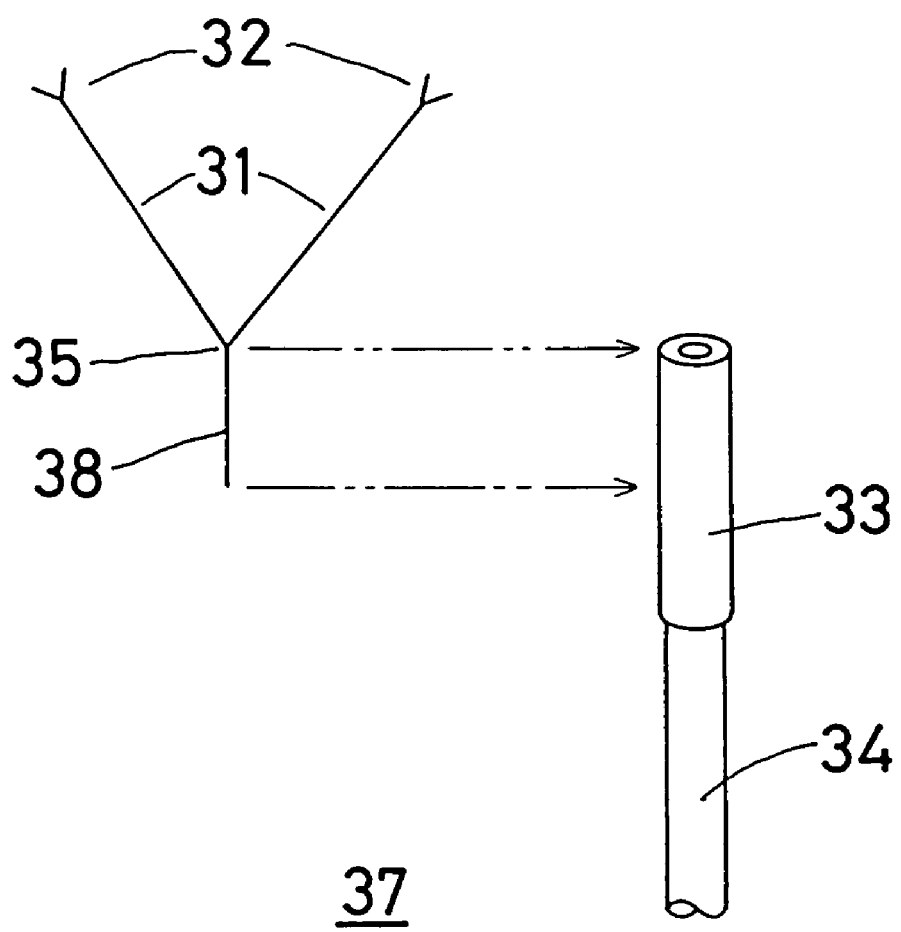
FIG. 12 is a perspective view showing principal parts of the tool for installing the annular sustained release pheromone-dispenser according to the present invention.

The tool 37 for installing the pheromone-dispenser according to the present invention comprises a metal wire 31 which is bent in a Y-shape at the center thereof and hooks 32 at the both ends of the metal wire, to which the pheromone-dispenser can be attached or detached, as shown in FIG. 12. The lower end portion 38 is fitted to a rod 33 by fusing or securing it to the rod from the top end thereof. The rod 33 may be secured to at telescopic extension rod 34.

The wire is preferably bent in a Y-shaped form and connected to the rod 33 at the central point. The hook 32 preferably has a spiral, U-shaped or V-shaped form.

The wire 31 and the hook 32 are preferably produced from a material having appropriate resiliency and restorability and repulsive power. More specifically, the material is selected from the group consisting of piano wires, wires of synthetic resins, composite wires of synthetic resins and metal wires and metal wires which can satisfy the foregoing requirements. The lower end portion 38 of the wire is secured to the rod 33 having a reasonable length such as SUS, synthetic resins, fiber reinforced plastics, metal pipes or bamboo and wooden rods. The rod 33 may be connected to the telescopic extension rod 34 depending on the height of plant to be protected.

In this regard, the length between the hook 32 and the bent portion point 35 of the wire preferably ranges from ⅙ to ⅖ times the circumferential length of the ring formed by the installed pheromone-dispenser and the angle of the Y-shaped form ranges from 40 to 120 degrees, preferably from 60 to 100 degrees. If the length and the angle are beyond the foregoing ranges respectively, it is difficult to form an annular form of the pheromone-dispenser and this makes the fitting thereof to plants difficult.

Figure 13:
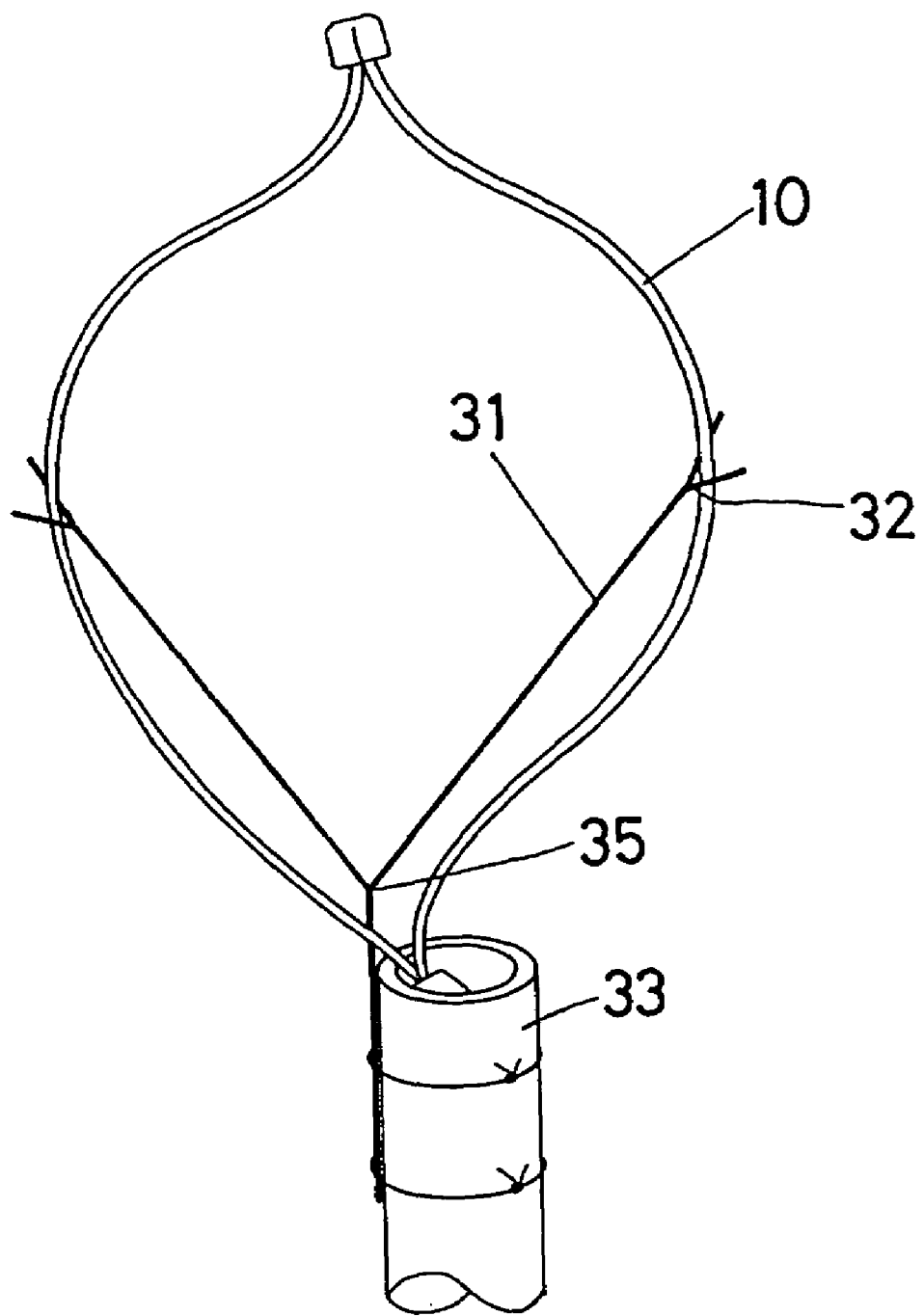
FIG. 13 is a perspective view showing main parts of the hooks of the tool for installing the annular sustained release pheromone-dispenser according to the present invention, to which the pheromone-dispenser is fitted.

More specifically, the cut formed on the foregoing sustained release pheromone-dispenser 10 is opened to convert it into an annular form (see FIG. 2(B)) and the two plastic tubes 2a and 2b of the annular sustained release pheromone-dispenser 10 each is hung on the corresponding hook 32 of the pheromone-dispenser installation tool as shown in FIG. 13. Then a branch 36 is put through the annular space of the pheromone-dispenser 10 as shown in FIG. 14. If the installation tool is pulled downward, the pheromone-dispenser 10 is detached from the hook 32 and installed at a predetermined position.

The wire bent in a Y-shaped form can prevent the detachment of the pheromone-dispenser from the hook 32 possibly observed when a branch is put through the pheromone-dispenser and the latter comes in contact with twigs and/or leaves.

The use of the installation tool of the invention permits easy and rapid attachment of the annular sustained release pheromone-dispenser to an elevated spot and this allows the substantial reduction of the cost required for the control of harmful insects.

The present invention will hereinafter be described in more detail with reference to the following Examples, but the present invention is not restricted to these specific Examples.

Examples 1 to 3 relates to an embodiment of the annular sustained release pheromone-dispenser, as shown in FIG. 2, according to the present invention. Example 4 relates to another embodiment of the annular sustained release pheromone-dispenser, as shown in FIG. 5, according to the present invention. Comparative Examples 1 to 5 relate to examples of pheromone-dispensers which are beyond the scope of the present invention.

EXAMPLE 1

A high density polyethylene was extrusion-molded into a plastic tube 2 having an inner diameter of 0.84 mm and a wall thickness of 0.35 mm. The plastic tube 2 was filled with a liquid synthetic sex pheromone 1 of a leafroller by aspiration. Two plastic tubes 2 of this kind were arranged in parallel, fused by heat-pressing with a die 8 having a length of 4 mm at pitches or intervals of 204 mm, followed by cutting the fused portions 6 to give annular sustained release pheromone-dispensers 10. The pheromone-dispenser 10 of this Example has an effective length L of 200 mm and a whole length of 204 mm. The amount of the liquid synthetic sex pheromone enclosed is about 80 mg per tube and accordingly, the total amount thereof enclosed is equal to about 160 mg per sustained release pheromone-dispenser comprising the foregoing two plastic tubes.

EXAMPLE 2

The same procedures used in Example 1 were repeated except that two plastic tubes filled with the liquid synthetic sex pheromone were fused by heat-pressing with a die having a length of 8 mm at pitches or intervals of 208 mm to give annular sustained release pheromone dispensers. The pheromone-dispenser of this Example is identical to that produced in Example 1 except that the length of the fused end portion is 4 mm and the whole length of the dispenser is 208 mm.

EXAMPLE 3

Similarly, there was produced an annular sustained release pheromone-dispenser identical to that produced in Example 1 except that the length of the fused end portion was 10 mm and the whole length of the dispenser was 220 mm.

COMPARATIVE EXAMPLE 1

The same procedures used in Example 1 were repeated except that two plastic tubes filled with the liquid synthetic sex pheromone were fused by heat-pressing with a die having a length of 1 mm at pitches or intervals of 201 mm to give annular sustained release pheromone-dispensers. The pheromone-dispenser of this Comparative Example 1 is identical to that produced in Example 1 except that the length of the fused end portion is 0.5 mm and the whole length of the dispenser is 201 mm.

COMPARATIVE EXAMPLE 2

Similarly, there was produced an annular sustained release pheromone-dispenser identical to that produced in Example 1 except that the length of the fused end portion was 1 mm and the whole length of the dispenser was 202 mm.

COMPARATIVE EXAMPLE 3

Similarly, there was produced an annular sustained release pheromone-dispenser identical to that produced in Example 1 except that the length of the fused end portion was 20 mm and the whole length of the dispenser was 240 mm.

COMPARATIVE EXAMPLE 4

A high density polyethylene was extrusion-molded into a plastic tube having an inner diameter of 0.84 mm and a wall thickness of 0.35 mm, which was provided with a fine aluminum wire in the proximity thereto. The plastic tube 2 was filled with a liquid synthetic sex pheromone of a leafroller by aspiration and then fused by heat-pressing with a die having a length of 8 mm at pitches or intervals of 208 mm, followed by cutting the fused portions to give pheromone-dispensers. The pheromone-dispenser of this Comparative Example 4 has an effective length L of 200 mm, a length of the fused end portions of 4 mm and a whole length of 208 mm. The amount of the liquid synthetic sex pheromone enclosed was about 80 mg per pheromone-dispenser.

As test fields, there were secured 8 fields (1 ha each), i.e., 8 apple orchards whose conditions were approximately identical. Total of 750 dispensers/ha of the annular sustained release pheromone-dispensers produced in the foregoing Examples 1 to 3 and Comparative Examples 1 to 3 were uniformly distributed in the 6 fields thereof at an installation density of 250 dispensers/ha for heights of 2.5 to 3.0 m above ground, 500 dispensers/ha for heights of eye level. An installation tool of the present invention was used for installation to the elevated spots. In one of the two remaining fields, the total of 1500 dispensers/ha of the pheromone-dispensers produced in Comparative Example 4 were uniformly distributed at an installation density of 500 dispensers/ha at heights of 2.5 to 3.0 m above ground, 1000 dispensers/ha at heights of eye level, also using the installation tool of the present invention for elevated spots. Any pheromone-dispenser was not distributed in the remaining one field as a control. In this regard, only the pheromone-dispenser of Comparative Examples 4 had an amount of the liquid synthetic sex pheromone enclosed therein of ½ times that of the other annular pheromone-dispensers 10 and therefore, the installation density thereof was doubled in order to equalize the amount of the released synthetic sex pheromone.

The annular sustained release pheromone-dispensers of Example 1 to 3 and Comparative Examples 1 to 3 were installed by pulling the central portion of the dispenser to form a ring and putting a branch of an apple tree through each ring as shown in FIG. 11. On the other hand, the pheromone-dispenser of Comparative Example 4 was installed by hanging each dispenser which had been bent in an approximately V-shaped form on a branch of an apple tree and then twisting it one time.

After two months from the installation of these pheromone-dispensers, each field was inspected for the drop rate of the dispensers and the percentage suffering due to the leafrollers. The percentage suffering is the rate (expressed in terms of %) of the number of leaves suffered from eating damage by the leafrollers with respect to 1000 leaves chosen randomly in each field. The results obtained are summarized in Table 1. Also listed in Table 1 is the time required for the installation of each pheromone-dispense.

TABLE 1

|  | Example | | | Comparative Example | | | | |
| --- | --- | --- | --- | --- | --- | --- | --- | --- |
| Pheromone-Dispenser | 1 | 2 | 3 | 1 | 2 | 3 | 4 | Cont. |
| No. of Installed Dispenser (/ha) | 750 | 750 | 750 | 750 | 750 | 750 | 1500 | — |
| Drop Rate (%) | 0.0 | 0.0 | 0.0 | 26.3 | 6.7 | 0.0 | 0.0 | — |

TABLE 1-continued

|  | Example | | | Comparative Example | | | | Cont. |
| --- | --- | --- | --- | --- | --- | --- | --- | --- |
| Pheromone-Dispenser | 1 | 2 | 3 | 1 | 2 | 3 | 4 | Cont. |
| Percentage Suffering (%) | 1.4 | 1.5 | 1.8 | 20.5 | 8.5 | 1.7 | 1.7 | 27.6 |
| Installation Time (min) | 51 | 50 | 53 | 49 | 51 | 63 | 154 | — |

As will be seen from the data listed in Table 1, the pheromone-dispensers of Example 1 (the length of the fused end portion: 2 mm), Example 2 (the length of the fused end portion: 4 mm), Example 3 (the length of the fused end portion: 10 mm), Comparative Example 3 (the length of the fused end portion: 20 mm) and Comparative Example 4 (having an aluminum wire incorporated) were found to have a drop rate of 0.0. Excellent in the control effect were the pheromone-dispensers of Examples 1 to 3 and comparative Examples 3 and 4. The annular sustained release pheromone-dispensers of Examples 1 to 3 and comparative Examples 1 to 3 had a higher amount of the synthetic sex pheromone as compared with that of Comparative Example 4 and were distributed at a low installation density and accordingly, they required shorter installation time. The annular sustained release pheromone dispenser of Comparative Example 3 took longer installation time compared to that of the Examples due to its expanded 20 mm fused end portion being stuck when taken out of a bundle or bag, and also being difficult to attach it to the installation tool of the annular sustained release pheromone-dispenser.

EXAMPLE 4

A high density polyethylene was extrusion-molded into two plastic tubes 12a and 12b each having an inner diameter of 1.00 mm and a wall thickness of 0.5 mm, which were integrally connected to each other through a web 15 having a thickness 0.25 mm and a width of 1.5 mm. When winding the plastic tubes 12a and 12b onto a reel, a rotatable perforation-like blade 24 was pressed against the web 15 to thus form a perforation on the web 15. After filling each plastic tube 12a or 12b with a synthetic sex pheromone of a leafroller, these plastic tubes were pressed at intervals of 20 cm, followed by sealing by the ultrasonic sealing, cutting the plastic tubes at the sealed portions to give annular sustained release pheromone-dispensers 10 each having an entire length of 20 cm according to the present invention. The pheromone-dispensers 10 were uniformly distributed in an apple orchard of 1 hr at an installation density of 150 dispensers/10 a. The installation operations were performed by tearing the web along the perforation 14 to form a ring-like pheromone dispenser 10 and then putting branches of apple trees through the rings as shown in FIG. 11.

COMPARATIVE EXAMPLE 5

To compare with the pheromone-dispenser of Example 4, a high density polyethylene was extrusion-molded, while enclosing an aluminum wire, into a plastic tube having an inner diameter of 1.00 mm and a wall thickness of 0.5 mm. The plastic tube was filled with a synthetic sex pheromone of a leafroller to give conventional pheromone-dispensers each having an entire length of 20 cm. The conventional pheromone-dispenser had an enclosed amount of the sex pheromone of ½ times that for the dispenser of the present invention and therefore, the comparative dispensers were uniformly distributed in an apple orchard of 1 ha at an installation density of 300 dispensers/10 a. The pheromone-dispenser of Comparative Example 5 was installed by hanging each dispenser which had been bent in an approximately V-shaped form on a branch of an apple tree and then twisting it one time.

As a result, the annular sustained release pheromone-dispenser 10 prepared in Example 4 according to the present invention had a percentage suffering, serving as an indication of the control effect, of 1.4 to 1.6% which is identical to that achieved by the dispenser of Comparative Example 5, since the installation density of the dispenser of Example 4 is ½ times that of the conventional dispenser, but the former comprising two plastic tubes 12a and 12b has an enclosed amount of the pheromone of two times that of the latter. The pheromone-dispenser 10 of Example 4 requires a low installation density and can easily be installed and accordingly, the installation time was not more than about ½ times that required for the pheromone-dispenser of comparative Example 5.

As has been discussed above in detail, the annular sustained release pheromone-dispenser according to the present invention exhibits a high control effect, can easily be installed, can maintain its installed condition over a long time period and never causes any damage of trees to be protected. Moreover, the dispenser of the invention has a linear shape favorable for packaging and transportation and can eliminate the need for the recovery of the used ones since it is free of any metal wire or the like. In addition, the method of the present invention permits the continuous production of a uniform annular sustained release pheromone-dispenser and this may serve to rationalize the production of the dispenser.

The use of the tool for installing the annular sustained release pheromone-dispenser of the invention permits the easy and rapid installation of the annular sustained release pheromone-dispenser of the present invention at an elevated spot of, for instance, fruit trees without using a ladder, a ladder truck or a specially designed hook and therefore, the tool would permit substantial reduction of the time required for the control operations and can save the production cost of, for instance, fruits or the growth of fruit trees.

What is claimed is:

1. A method for preparing an annular sustained release pheromone-dispenser comprising arranging a plurality of continuous plastic tubes wherein said tubes have a diffusivity and a permeability to a liquid synthetic sex pheromone; filling the tubes with the liquid synthetic sex pheromone by aspiration; fusing the tubes at predetermined points by heating under pressure to connect the tubes to each other and to seal each tube at the points; cutting the tubes at a middle of each such fused portion to produce a dispenser composed of two side by side tubes having closely sealed both end portions which are connected to each other and a central portion; and pulling apart the central portion to separate the central portion of each tube from the central portion of the other tube.

2. The method for preparing an annular sustained release pheromone-dispenser as set forth in claim 1 wherein the plurality of plastic tubes are fused by heating under a pressure after sandwiching the portion to be fused between a pair of pieces made of a plastic identical to that of the plastic tubes.

* * * * *